United States Patent
Yanagisawa et al.

(10) Patent No.: US 10,434,577 B2
(45) Date of Patent: Oct. 8, 2019

(54) METHOD FOR PRODUCING NICKEL POWDER

(71) Applicants: KOCHI UNIVERSITY, NATIONAL UNIVERSITY CORPORATION, Kochi-shi, Kochi (JP); SUMITOMO METAL MINING CO., LTD., Tokyo (JP)

(72) Inventors: Kazumichi Yanagisawa, Kochi (JP); Junhao Zhang, Kochi (JP); Kazuyuki Takaishi, Niihama (JP); Tomoaki Yoneyama, Niihama (JP); Shin-ichi Heguri, Niihama (JP); Hideki Ohara, Niihama (JP); Osamu Ikeda, Niihama (JP); Yohei Kudo, Niihama (JP); Yoshitomo Ozaki, Niihama (JP)

(73) Assignees: KOCHI UNIVERSITY, NATIONAL UNIVERSITY CORPORATION (JP); SUMITOMO METAL MINING CO., LTD. (JP)

( * ) Notice: Subject to any disclaimer, the term of this patent is extended or adjusted under 35 U.S.C. 154(b) by 327 days.

(21) Appl. No.: 15/127,816

(22) PCT Filed: Mar. 24, 2015

(86) PCT No.: PCT/JP2015/058941
§ 371 (c)(1),
(2) Date: Sep. 21, 2016

(87) PCT Pub. No.: WO2015/146989
PCT Pub. Date: Oct. 1, 2015

(65) Prior Publication Data
US 2017/0095862 A1    Apr. 6, 2017

(30) Foreign Application Priority Data

Mar. 26, 2014 (JP) .................................. 2014-063106
Jul. 30, 2014 (JP) .................................. 2014-155547
Jan. 22, 2015 (JP) .................................. 2015-010720

(51) Int. Cl.
*B22F 9/26* (2006.01)
*B22F 9/24* (2006.01)
(Continued)

(52) U.S. Cl.
CPC .............. *B22F 9/24* (2013.01); *B01D 9/0036* (2013.01); *B22F 9/26* (2013.01); *H01M 4/38* (2013.01);
(Continued)

(58) Field of Classification Search
None
See application file for complete search history.

(56) References Cited

U.S. PATENT DOCUMENTS 3,640,706 A * 2/1972 Zubryckyj .......... C22B 23/0461
75/370
3,816,098 A   6/1974 Mackiw
(Continued)

FOREIGN PATENT DOCUMENTS

CN    101428349 A    5/2009
CN    101429652 A    5/2009
(Continued)

OTHER PUBLICATIONS

English translation of CN 101429652 (published May 2009) from Espacenet.*
(Continued)

*Primary Examiner* — George Wyszomierski
(74) *Attorney, Agent, or Firm* — Gerald E. Hespos; Michael J. Porco; Matthew T. Hespos

(57) ABSTRACT

Provided is nickel powder obtained by adding seed crystals to a nickel ammine complex solution and performing hydrogen reduction reaction under high temperatures and high
(Continued)

pressures, wherein the nickel powder does not produce dust during handling, and a container can be efficiently filled with the nickel powder. The method for producing nickel powder includes: adding seed crystals and a surfactant having a nonionic or anionic functional group to a solution containing a nickel ammine complex to forma mixed slurry; and subjecting the mixed slurry to hydrogen reduction under high temperature and high pressure conditions in a pressure vessel to obtain nickel powder from the mixed slurry.

5 Claims, 2 Drawing Sheets

(51) Int. Cl.
H01M 4/38 (2006.01)
H01M 10/30 (2006.01)
B01D 9/00 (2006.01)
(52) U.S. Cl.
CPC ....... *H01M 10/30* (2013.01); *B22F 2009/245* (2013.01); *B22F 2301/15* (2013.01); *B22F 2998/10* (2013.01); *B22F 2999/00* (2013.01)

(56) References Cited

U.S. PATENT DOCUMENTS

| | | | |
|---|---|---|---|
| 4,148,632 A | 4/1979 | Seibt | |
| 2004/0074336 A1 | 4/2004 | Daimon et al. | |
| 2010/0280296 A1 | 11/2010 | Bisson et al. | |
| 2012/0093597 A1 | 4/2012 | Ederyd | |
| 2014/0363676 A1* | 12/2014 | Son | B22F 1/0018 428/403 |
| 2017/0008090 A1* | 1/2017 | Yanagisawa | B22F 9/26 |

FOREIGN PATENT DOCUMENTS

| | | | |
|---|---|---|---|
| JP | 4322395 B1 | 9/1968 | |
| JP | 4974160 A | 7/1974 | |
| JP | H10317022 A | 12/1998 | |
| JP | 2005002395 A | 1/2005 | |
| JP | 2011149080 A | 8/2011 | |
| JP | 2012077372 A | 4/2012 | |
| JP | 2012525501 A | 10/2012 | |

OTHER PUBLICATIONS

Japanese Office Action dated Jul. 9, 2018.
"A review of the precipitation of nickel from salt solutions by hydrogen reduction" by Thomas Saarinen et al. 1998.
"Effect of crystallisation on the reaction kinetics of nickel reduction by hydrogen" by Yi Fei Zhang et al. 2006.
"Large-scale controllable preparation and performance of hierarchical nickel microstructures by a seed-meditated solution hydrogen reduction route" by Junhao Zhang et al. 2015.
European Search Report dated Dec. 1, 2017.
Chinese Office Action dated Jan. 4, 2018.
The Manufacturing and Properties of Metal Powders Produced by the Gaseous Reduction of Aqueous Solutions.
Interational Search Report for Application No. PCT/JP2015/058941 dated Jun. 19, 2015.

\* cited by examiner

Fig.1
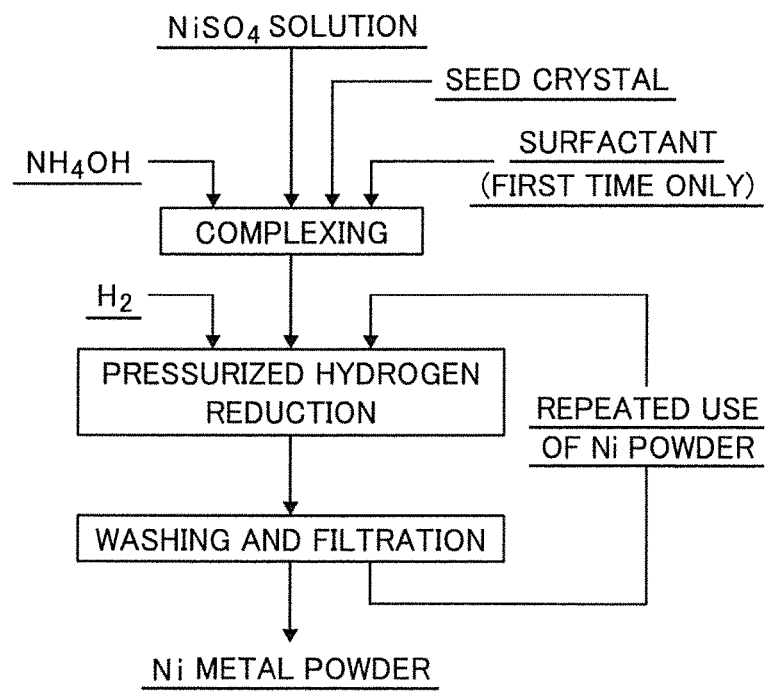
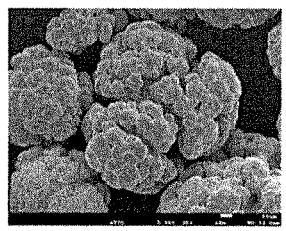
Fig. 2(a)
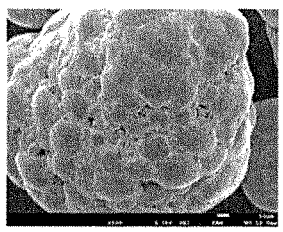
Fig. 2(b)
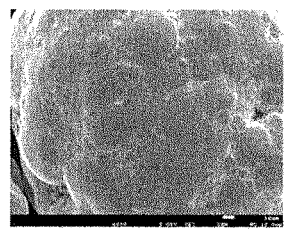
Fig. 2(c)
×500
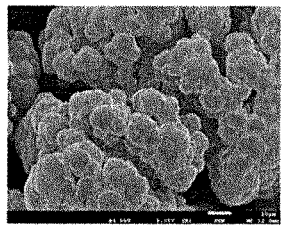
Fig. 2(d)
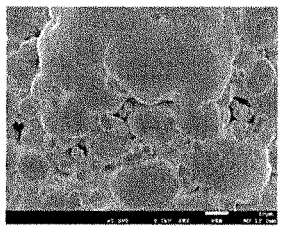
Fig. 2(e)
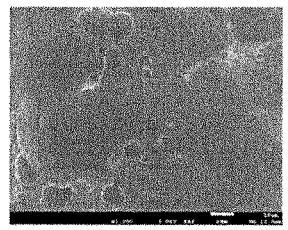
Fig. 2(f)
×1000

METHOD FOR PRODUCING NICKEL POWDER

BACKGROUND

1. Field of the Invention

The present invention relates to a method for producing nickel powder having a large particle size in which the surface is smoothed and the inner part is densified, in a step of blowing hydrogen gas into a nickel ammine sulfate complex solution under high temperatures and high pressures to obtain nickel powder.

2. Description of the Related Art

The use of nickel powder as a functional material and a positive electrode active material of a nickel-hydrogen battery and the like has been advanced, and a method for producing nickel powder using a wet process as a method for producing such nickel powder has been developed.

As a method for producing nickel powder industrially by the wet process, a method for producing nickel powder by adding a reducing agent to reduce nickel from solution has been developed, and especially, a method of reducing nickel using hydrogen gas as a reducing agent is industrially inexpensive and has been widely used.

This method is described as a process for producing nickel powder by "Sherritt Gordon Inc.", as shown in POWDER METALLURGY, 1958, No. 1/2, P. 40-52. This process includes mixing a complexing agent with a nickel sulfate aqueous solution to form a solution containing a nickel ammine complex, putting the solution in a pressure vessel followed by sealing the vessel, heating the solution to about 150 to 250° C. to obtain saturated vapor pressure, and blowing hydrogen gas into the solution, in which the nickel ammine complex is reduced by hydrogen to obtain nickel powder.

The nickel powder obtained by this method includes uneven particles having voids on the surface thereof. The nickel powder has problems in that, when the powder is shipped as a nickel metal product in the form of powder as it is, the powder produces dust since it has a small particle size; and since the powder has unevenness, it has a low bulk density and requires excess volume when a container is filled with the powder.

The present invention intends to solve the above problems that when nickel powder, which is obtained by adding seed crystals to a nickel ammine complex solution in an autoclave and performing hydrogen reduction reaction under high temperatures and high pressures, is shipped as a nickel metal product in the form of powder as it is, the powder produces dust; and since the powder has unevenness, it has a low bulk density and requires excess volume when a container is filled with the powder. The present invention provides nickel powder which is obtained by adding seed crystals to a nickel ammine complex solution and performing hydrogen reduction reaction under high temperatures and high pressures, wherein the nickel powder does not produce dust during handling, and a container can be efficiently filled with the nickel powder.

SUMMARY

The first aspect of the present invention to solve the problem described above is a method for producing nickel powder, including: adding seed crystals of nickel powder having voids and a surfactant having a nonionic or anionic functional group to a solution containing a nickel ammine complex to form a mixed slurry; and subjecting the mixed slurry to hydrogen reduction under high temperature and high pressure conditions in a pressure vessel to obtain nickel powder from the mixed slurry; and then using the obtained nickel powder as the seed crystals repeatedly at least twice to grow the nickel powder.

The second aspect of the present invention is a method for producing nickel powder, the nickel powder being formed by adding seed crystals and a surfactant having a nonionic or anionic functional group to a solution containing a nickel ammine complex, the seed crystals of nickel powder having voids, the method sequentially including:

(1) a complexing step of adding ammonia gas or aqueous ammonia ($NH_4OH$) to a nickel sulfate ($NiSO_4$) solution to form an ammine complex of nickel to obtain a nickel ammine sulfate complex solution;

(2) a seed crystal and surfactant addition step of adding, to the nickel ammine sulfate complex solution obtained in the complexing step (1), a seed crystal slurry containing nickel powder serving as the seed crystals having voids, followed by adding thereto a surfactant to form a mixed slurry;

(3) a reduction step of blowing hydrogen gas into the mixed slurry obtained in the seed crystal and surfactant addition step (2) to reduce nickel in the mixed slurry to precipitate the nickel into the voids of the seed crystals to form a reduced slurry containing reduced nickel powder, followed by subjecting the reduced slurry to solid-liquid separation treatment to form nickel powder; and (4) a growing step of adding, to the nickel powder formed in the reduction step (3), the nickel ammine sulfate complex solution obtained in the complexing step (1) to form a nickel complex slurry containing nickel powder, feeding the nickel complex slurry containing nickel powder to the reduction step (3) as the mixed slurry used in the reduction step (3), and subjecting the mixed slurry to reduction treatment by hydrogen gas to grow the nickel powder in the nickel complex slurry containing nickel powder at least twice, thus producing product nickel powder.

The third aspect of the present invention is a method for producing nickel powder according to the first and second aspects, wherein the surfactant having a nonionic functional group is either polyethylene glycol or polyvinyl alcohol.

The fourth aspect of the present invention is a method for producing nickel powder according to the first and second aspects, wherein the surfactant having an anionic functional group is sodium polyacrylate.

The fifth aspect of the present invention is a method for producing nickel powder according to the first to fourth aspects, wherein the surfactant having a nonionic or anionic functional group is added in an amount of 1 to 20% by weight of the seed crystals added to the solution containing the nickel ammine complex.

According to the method for producing high purity nickel powder of the present invention, the unevenness on the surface of the powder is suppressed to allow the powder to have a smooth surface. Thus, since nickel powder having dense surface texture as shown in FIG. 2 and also having a large particle size can be obtained, handling will be easy, which provides high industrial value.

Further, dense nickel powder shown in FIG. 3 is obtained, in which the bulk density of the powder is increased, and the powder generates the effect of reducing the volume of a vessel when the vessel is filled with the powder.

BRIEF DESCRIPTION OF THE DRAWINGS

FIG. 1 is a production flow chart of nickel powder of the present invention.

FIGS. 2(a)-2(f) shows SEM images of nickel powder after reduction reaction of the present invention, in which reference characters (a) and (d) show seed crystals; reference characters (b) and (e) show pre-growth nickel powder; and reference characters (c) and (f) show post-growth nickel powder.

DETAILED DESCRIPTION

Figure 3:
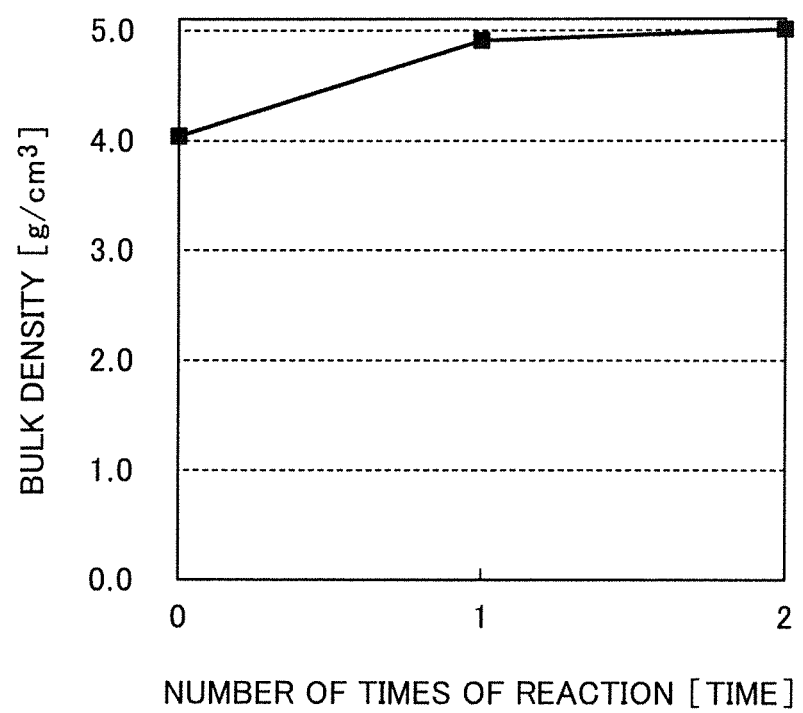
FIG. 3 shows a change of bulk density with the repetition of reduction reaction of the nickel powder of the present invention.

The method for producing nickel powder according to the present invention will be described with reference to the production flow chart of the nickel powder of the present invention shown in FIG. 1.

Note that examples of the method for obtaining a nickel sulfate solution before the complexing step include a method comprising subjecting nickel oxide ore to pressure leach by a known method, neutralizing the resulting leachate to remove impurities, adding a sulfurizing agent to the solution after removing impurities to precipitate nickel as a sulfide, then dissolving the sulfide containing nickel with sulfuric acid or the like, and separating nickel from other impurities by a method such as known solvent extraction to prepare the nickel sulfate solution.

(1) Complexing Step

This is a step of adding ammonia gas or aqueous ammonia ($NH_4OH$) to a nickel sulfate ($NiSO_4$) solution to form an ammine complex of nickel.

In doing so, ammonia is added so that the molar ratio of the ammonium concentration to the nickel concentration in the solution is 1.9 or more. If the molar ratio is less than 1.9, a part of nickel in solution will not form an ammine complex but produce a precipitate of nickel hydroxide.

Further, ammonium sulfate may be added in this step in order to adjust the ammonium sulfate concentration. The ammonium sulfate concentration at that time is preferably 100 to 500 g/L. If ammonium sulfate is added in an amount exceeding an ammonium sulfate concentration of 500 g/L, the solubility will be exceeded to precipitate crystals, and an ammonium sulfate concentration of less than 100 g/L will be difficult to be achieved in terms of the metal balance of the process.

(2) Seed Crystal and Surfactant Addition Step

In this step, to the nickel ammine sulfate complex solution obtained in the "complexing step" (1), is added a seed crystal slurry containing nickel powder having an average particle size of 10 to 200 μm serving as seed crystals, and then thereto is added a surfactant for smoothing the surface in an amount of 1 to 20% by weight based on the weight of the nickel powder in the seed crystal slurry to form a mixed slurry.

As the surfactant to be added, at least one of polyethylene glycol and polyvinyl alcohol each having a nonionic functional group can be used, or sodium polyacrylate having an anionic functional group can be used. If the amount of the surfactant added is as small as less than 1% by weight, the effect of smoothing is small, and if the amount of the surfactant added is as large as more than 20% by weight, the amount is not desirable in terms of impurities and the cost of the chemical.

(3) Reduction Step

In this step, hydrogen gas is blown into the mixed slurry obtained in the "seed crystal and surfactant addition step" (2) to precipitate nickel from solution into the voids of the seed crystals to form a reduced slurry containing reduced nickel powder, and then the reduced slurry is subjected to solid-liquid separation treatment to produce pre-growth nickel powder which is reduced nickel powder.

In doing so, reaction temperature is preferably 150 to 200° C.

If the reaction temperature is less than 150° C., reduction efficiency will be reduced, and even if it exceeds 200° C., the reaction will not be affected, but the loss of thermal energy will increase.

Further, the pressure during the reaction is preferably 1.0 to 4.0 MPa. If the pressure is less than 1.0 MPa, reaction efficiency will be reduced, and even if it is higher than 4.0 MPa, the reaction will not be affected, but the loss of hydrogen gas will increase.

(4) Growth Step

In this step, the nickel ammine sulfate complex solution obtained in the "complexing step" (1) is added to the "pre-growth nickel powder" which has been recovered by subjecting the reduced slurry produced in the "reduction step" (3) to solid-liquid separation treatment to form a nickel complex slurry, which is fed again as the "mixed slurry" in the "reduction step" (3). The nickel complex slurry is subjected to reduction treatment by hydrogen gas to grow the "pre-growth nickel powder" in the nickel complex slurry into "post-growth nickel powder" to produce "product nickel powder".

The growth step (4) is repeated at least once to thereby grow nickel powder and densely smooth the surface thereof.

EXAMPLES

The present invention will be further described below using Examples.

Example 1

[Complexing Step]

A complexing treatment was performed to prepare a solution containing a nickel ammine sulfate complex, by adding 191 ml of 25% aqueous ammonia to a solution containing 336 g of nickel sulfate and 330 g of ammonium sulfate and adjusting the total volume of the resulting solution to 1000 ml.

[Seed Crystal and Surfactant Addition Step]

The seed crystal and surfactant addition step was performed to prepare a mixed slurry, by adding a seed crystal slurry containing 75 g of seed crystals to the above solution and further adding thereto 2.5 g (3% by weight) of polyethylene glycol "PEG-20000" (manufactured by NOF CORPORATION) as a nonionic surfactant.

[Reduction Step]

Next, the reduction treatment was performed by charging an autoclave as a high pressure vessel with the mixed slurry, heating the mixed slurry to 185° C. with stirring, then blowing hydrogen gas as a reducing agent into the mixed slurry, and feeding hydrogen gas so as to maintain the pressure in the autoclave at 3.5 MPa.

After a lapse of one hour from the start of the feeding of hydrogen gas, the feeding of hydrogen gas was stopped, and the autoclave was cooled. The reduced slurry obtained after cooling was subjected to solid-liquid separation by washing and filtration to recover pre-growth nickel powder.

[Growth Step]

The recovered pre-growth nickel powder was again added to the solution containing a nickel ammine complex prepared through complexing treatment by adding 191 ml of 25% aqueous ammonia to a solution containing 336 g of nickel sulfate and 330 g of ammonium sulfate and adjusting the total volume of the resulting solution to 1000 ml, and the reaction was repeated to obtain product nickel powder having a smooth surface.

Further, an increase in the bulk density was also observed with an increase in the reduction treatment (the number of times of the reaction) in the growth step.

Furthermore, when a 50-cc shipping container was filled with the nickel powder, the powder did not scatter, and the operation was able to be performed without running a local exhaust ventilation.

Example 2

A complexing treatment was performed to prepare a solution containing a nickel ammine complex, by adding 191 ml of 25% aqueous ammonia to a solution containing 336 g of nickel sulfate and 330 g of ammonium sulfate and adjusting the total volume of the resulting solution to 1000 ml.

[Seed Crystal and Surfactant Addition Step]

The seed crystal and surfactant addition step was performed to prepare a mixed slurry, by adding a seed crystal slurry containing 75 g of seed crystals to the above solution and further adding thereto 5.0 g (7% by weight) of polyvinyl alcohol "PVA-2000" (manufactured by Kanto Chemical Co., Inc.) as a nonionic surfactant.

[Reduction Step]

Next, the reduction treatment was performed by charging an autoclave as a high pressure vessel with the mixed slurry, heating the mixed slurry to 185° C. with stirring, then blowing hydrogen gas as a reducing agent into the mixed slurry, and feeding hydrogen gas so as to maintain the pressure in the autoclave at 3.5 MPa.

After a lapse of one hour from the start of the feeding of hydrogen gas, the feeding of hydrogen gas was stopped, and the autoclave was cooled. The reduced slurry obtained after cooling was subjected to solid-liquid separation by washing and filtration to recover pre-growth nickel powder.

[Growth Step]

The recovered pre-growth nickel powder was again added to the solution containing a nickel ammine complex prepared through complexing treatment by adding 191 ml of 25% aqueous ammonia to a solution containing 336 g of nickel sulfate and 330 g of ammonium sulfate and adjusting the total volume of the resulting solution to 1000 ml, and the reaction was repeated to obtain product nickel powder having a smooth surface.

Further, an increase in the bulk density was also observed with an increase in the reduction treatment (the number of times of the reaction) in the growth step.

Furthermore, when a 50-cc shipping container was filled with the nickel powder, the powder did not scatter, and the operation was able to be performed without running a local exhaust ventilation.

Example 3

The complexing treatment was performed to prepare a solution containing a nickel ammine complex, by adding 191 ml of 25% aqueous ammonia to a solution containing 336 g of nickel sulfate and 330 g of ammonium sulfate and adjusting the total volume of the resulting solution to 1000 ml.

[Seed Crystal and Surfactant Addition Step]

The seed crystal and surfactant addition step was performed to prepare a mixed slurry, by adding a seed crystal slurry containing 75 g of seed crystals to the above solution and further adding thereto 3.73 g (2% by weight) of Na polyacrylate "PAA-6000" (T-50 manufactured by Toagosei Co., Ltd.: having a solid content of 40%) as an anionic surfactant.

[Reduction Step]

Next, the reduction treatment was performed by charging an autoclave as a high pressure vessel with the mixed slurry, heating the mixed slurry to 185° C. with stirring, then blowing hydrogen gas as a reducing agent into the mixed slurry, and feeding hydrogen gas so as to maintain the pressure in the autoclave at 3.5 MPa.

After a lapse of one hour from the start of the feeding of hydrogen gas, the feeding of hydrogen gas was stopped, and the autoclave was cooled. The reduced slurry obtained after cooling was subjected to solid-liquid separation by washing and filtration to recover pre-growth nickel powder.

[Growth Step]

The recovered pre-growth nickel powder was again added to the solution containing a nickel ammine complex prepared through complexing treatment by adding 191 ml of 25% aqueous ammonia to a solution containing 336 g of nickel sulfate and 330 g of ammonium sulfate and adjusting the total volume of the resulting solution to 1000 ml, and the reaction was repeated to obtain product nickel powder having a smooth surface as shown in FIG. 2.

Further, as shown in FIG. 3, an increase in the bulk density was observed by the reduction treatment in the growth step.

Comparative Example 1

The complexing treatment was performed to prepare a solution containing a nickel ammine complex, by adding 191 ml of 25% aqueous ammonia to a solution containing 336 g of nickel sulfate and 330 g of ammonium sulfate and adjusting the total volume of the resulting solution to 1000 ml.

[Seed Crystal and Surfactant Addition Step, Reduction Step]

A mixed slurry was prepared by adding only a seed crystal slurry containing 75 g of seed crystals to the above solution.

Next, the reduction treatment was performed by charging an autoclave as a high pressure vessel with the prepared mixed slurry, heating the mixed slurry to 185° C. with stirring, blowing hydrogen gas as a reducing agent into the mixed slurry, and feeding hydrogen gas so as to maintain the pressure in the autoclave at 3.5 MPa.

After a lapse of one hour from the start of the feeding of hydrogen gas, the feeding of hydrogen gas was stopped, and the autoclave was cooled. Then, the slurry obtained after cooling was subjected to washing and filtration to recover nickel powder.

The recovered nickel powder was nickel powder in which the outside surface thereof had the same unevenness as the seed crystals.

Further, a 50-cc shipping container was intended to be filled with the resulting nickel powder, but dust scattered when a local exhaust ventilation was not run.

The invention claimed is:

1. A method for producing nickel powder, by adding, in order, seed crystals and a surfactant having a nonionic or anionic functional group to a solution containing a nickel ammine complex to form nickel powder, the seed crystals of nickel powder having voids, the method sequentially comprising:

(1) a complexing step of adding ammonia gas or aqueous ammonia ($NH_4OH$) to a nickel sulfate ($NiSO_4$) solution to form an ammine complex of nickel to obtain a nickel ammine sulfate complex solution;

(2) a seed crystal and surfactant addition step of adding, to the nickel ammine sulfate complex solution obtained in the complexing step (1), a seed crystal slurry containing nickel powder serving as the seed crystals having voids, and then adding thereto a surfactant to form a mixed slurry;

(3) a reduction step of blowing hydrogen gas into the mixed slurry obtained in the seed crystal and surfactant addition step (2) to reduce nickel in the mixed slurry to precipitate the nickel into the voids of the seed crystals to form a reduced slurry containing reduced nickel powder, and then subjecting the reduced slurry to solid-liquid separation treatment by washing and filtration to recover the reduced nickel powder as a washed and reduced nickel powder; and (4) a growing step of adding the washed and reduced nickel powder recovered in the reduction step (3) to the nickel ammine sulfate complex solution obtained in the complexing step (1) as the seed crystals in the seed crystal and surfactant addition step to form a nickel complex slurry containing nickel powder, feeding the nickel complex slurry containing nickel powder to the reduction step (3) as a mixed slurry used in the reduction step (3), and subjecting the mixed slurry to reduction treatment by hydrogen gas to grow the nickel powder in the nickel complex slurry containing nickel powder, wherein the growing step is performed at least twice to produce product nickel powder.

2. The method for producing nickel powder according to claim 1, wherein the surfactant having a nonionic functional group is either polyethylene glycol or polyvinyl alcohol.

3. The method for producing nickel powder according to claim 1, wherein the surfactant having an anionic functional group is sodium polyacrylate.

4. The method for producing nickel powder according to claim 3, wherein the surfactant having a nonionic or anionic functional group is added in an amount of 1 to 20% by weight of the seed crystals added to the solution containing the nickel ammine complex.

5. The method for producing nickel powder according to claim 1, wherein the surfactant having a nonionic or anionic functional group is added in an amount of 1 to 20% by weight of the seed crystals added to the solution containing the nickel ammine complex.

* * * * *